United States Patent Office 3,531,356
Patented Sept. 29, 1970

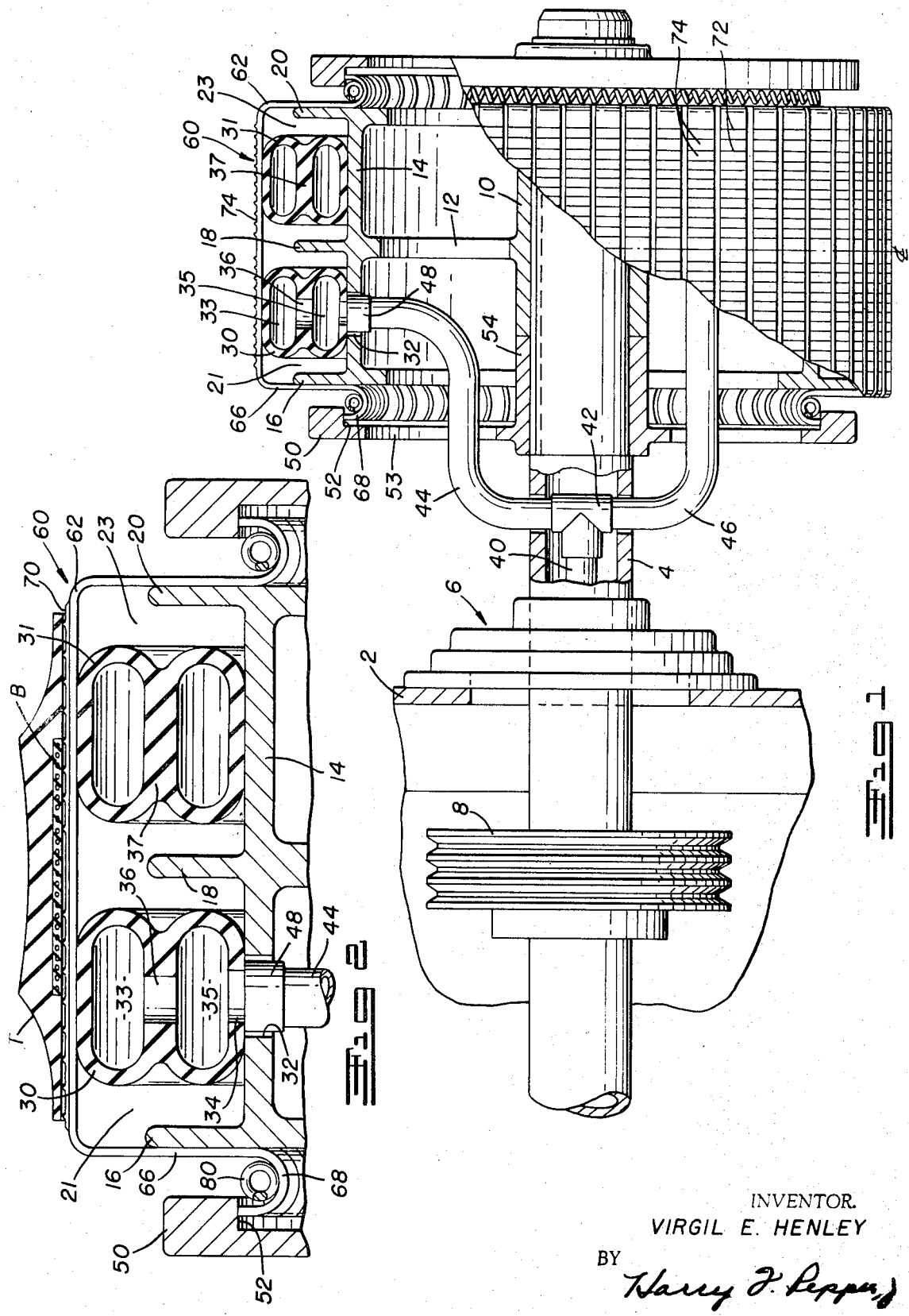

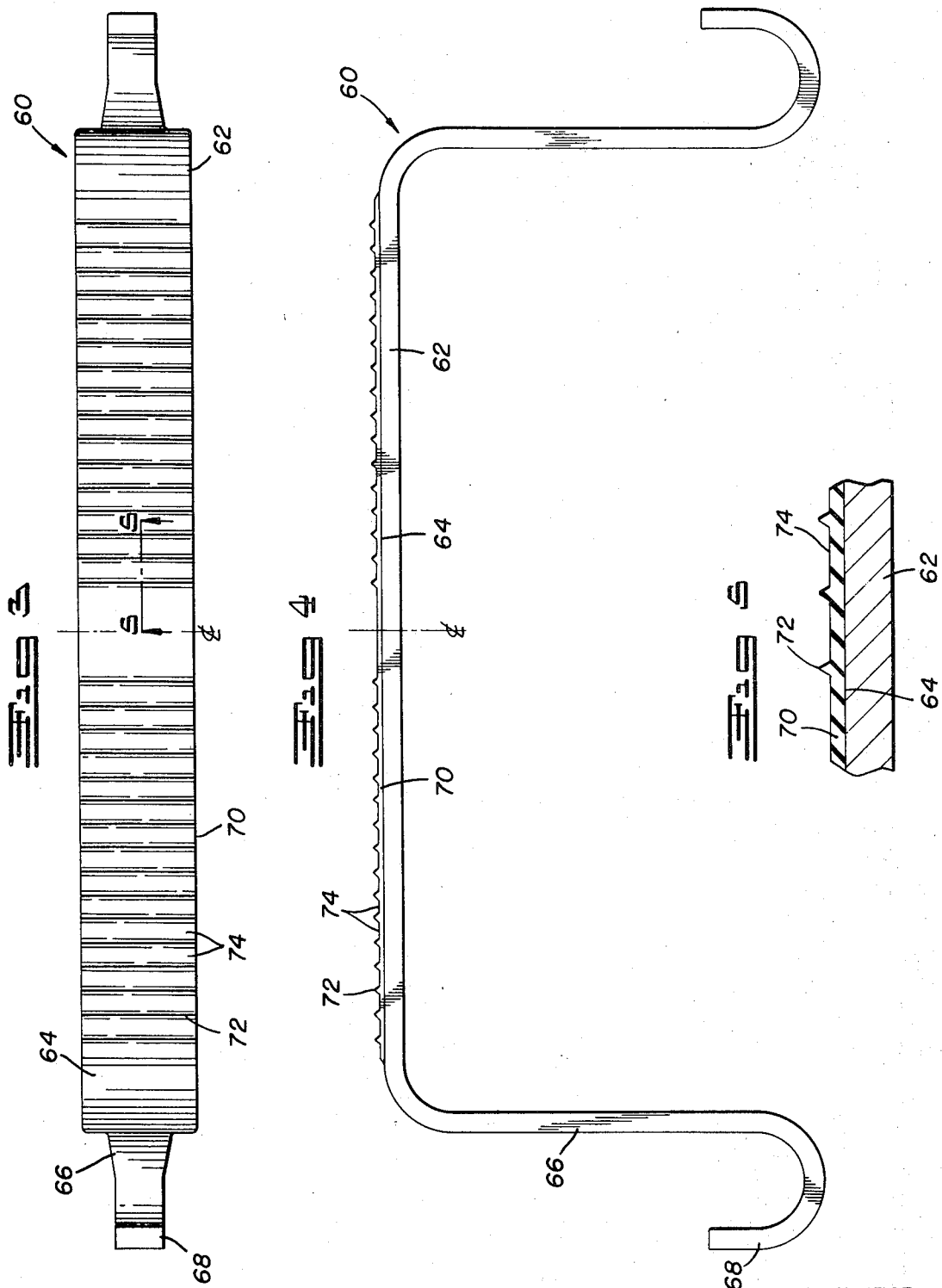

3,531,356
EXPANSIBLE DRUM FOR THE ASSEMBLY OF CERTAIN INEXTENSIBLE TIRE COMPONENTS
Virgil E. Henley, Akron, Ohio, assignor to The General Tire & Rubber Company, a corporation of Ohio
Filed Nov. 22, 1967, Ser. No. 685,202
Int. Cl. B29h 17/16
U.S. Cl. 156—416                         6 Claims

ABSTRACT OF THE DISCLOSURE

Cylindrical drums used in tire building operations often have radially expansible outer surfaces which include thin, radially movable, metal segments with flat outer faces. The holding characteristics of these metal segments can be improved by securing a thin elastomeric strip to each along the outer face thereof. Each elastomeric strip is preferably provided with a plurality of raised projections which serve as guides for placement of tire components on the drum and to further enhance the holding or gripping characteristics of the segments.

Background of the invention

The recent development of the belted pneumatic tire has necessitated several modifications in tire building processes and equipment. The "belted" tire is so named because it includes a circumferentially extending, endless belt of parallel rubberized cords located in the crown area of the tire between the carcass and the tread portion. Many tires of this type include a plurality of these circumferential belts in superposed relation for additional strength. A primary distinguishing feature of these tires is the relatively small angular relation between the parallel cords of the belt and the circumferential plane of the tire. In other words, the parallel rubberized cords of a belt, using the circumferential center line of the tread as a reference, cross the plane of this circumferential center line at a relatively small acute angle. It has been found that tires with such belts exhibit a higher degree of lateral stability than has heretofore been achieved.

There are tires which include similar endless, circumferentially extending members, commonly known as breakers. These breakers contain parallel rubberized cords which cross the circumferential plane of the tire at a relatively large angle, typically at a value between 25° and 40°. These breakers afford a certain degree of lateral stability to the tire, but are mainly designed to protect the underlying carcass plies of the tire. As a comparison, the cords of a typical circumferential belt cross the circumferential plane of a tire at an angle between 0° and 15°.

Because of these respective angle relationships with the circumferential plane of the tire, it is seen that a typical breaker is extensible, radially of the tire, while a belt is not. This characteristic has caused problems in building of belted tires by presently existing methods.

Pneumatic tires, including those designed with the aforementioned large angle breakers, are typically built by what is commonly called the flat-band process, utilizing steps and equipment similar to that disclosed in United States Pats. 2,614,951; 2,614,952 and 2,628,652. The tire is built by laying up the various tire components on a cylindrical tire building drum with an expansible outer surface. Each component is accurately positioned upon the drum and is placed according to a predetermined sequence of steps which are more fully described in the aforementioned United States Pats. 2,614,951; 2,614,952; and 2,628,652. After completion of the assembly, the construction is expanded to approximately its "finished tire" diameter, removed from the building drum, shaped and cured in a mold. As previously mentioned, a tire which includes a large angle breaker may be built according to this process since the large angle of the cords allows the breaker, initially placed around the drum at a smaller diameter, to radially expand with the entire construction to approximately its finished tire diameter.

This flat band process cannot be used to build a tire which is to include the previously mentioned endless circumferential belt. A belt, although similarly positioned as a breaker, is in effect as an inextensible breaker, because of its small cord angle. Further because of its position in a tire, any tire component placed directly over such a belt, when building a tire by the flat band process could not expand radially of the tire building drum. Thus, a belt, any additional superposed belts, and the tread stock of the tire must initially be assembled to their finished tire diameter. Because of this situation, it is preferable to build a tire construction by assembling all but the inextensible components on the tire building drum, expanding the assembled construction to approximately its final diameter and then properly positioning the inextensible tire components, already assembled according to their final dimension, on the expanded construction.

A novel process and apparatus for building a belted radial ply tire in this way has recently been developed and is the subject of United States patent application Ser. No. 423,442, which is assigned to the same assignee of the present invention. In this tire building operation, three basic pieces of equipment are employed. There is the tire building drum upon which the basic tire structure is formed, an additional drum with an expansible outer surface used to build the belt and tread assembly to its final diameter, and a transfer mechanism used to transfer the belt and tread assembly from this additional drum to a coaxial position around the tire building drum.

The mechanism disclosed in said United States application Ser. No. 423,442, used to transfer the belt and tread assembly generally comprises a cylindrical ring with its radial inner surface provided with a plurality of gripping members which are movable radially inwardly from that inner surface. The ring is of such a diameter that it is freely movable to a circumferentially spaced, coaxial position with respect to either the tire building drum or the fully expanded belt and tread assembly drum.

The belt and tread assembly are built on the assembly drum with its outer surface in a radially expanded position. The transfer mechanism is moved to a position so that the annular ring is disposed around the belt and tread assembly. The gripping members move radially inwardly to grip the belt and tread assembly. The outer surface of the assembly drum is retracted and the belt and tread assembly is held within the transfer ring. The transfer mechanism is then moved to its proper position around the tire building drum. The tire building drum expands the construction, which has been built thereon, into contact with the belt and tread assembly held by the transfer mechanism. The gripping members thereafter relase their hold on the belt and tread assembly.

It has been found that when building the belt, or belts, and tread upon the belt and tread assembly drum disclosed in United States application Ser. No. 423,442, the tire builder must take extreme care that each circumferentially extending tire component maintain an exact position with respect to the ends of the drum. If this position varies during assembly, then upon subsequent removal by the transfer mechanism, the belt and tread assembly will not be properly positioned within the annular ring. Further, it has been found that although the tire components are initially accurately positioned circumferentially of the assembly drum, the tire components may move slightly from this position either when contacted by the gripping members of the transfer mechanism or accidentally by the tire builder. A belt and tread assembly not properly positioned within the transfer mechanism, will, when released by the transfer mechanism over the expanded tire building drum, assume an improper location in the finished tire.

Summary of the invention

It is an object of this invention to provide an improved assembly drum whereby tire components which are assembled thereon will be accurately positioned upon the surface of the drum, and when accurately positioned, will remain so.

It is another object of this invention to provide a novel surface for an assembly drum which functions to hold tire components assembled thereon in their initially assembled position.

It is still another object of this invention to provide a surface for a tire component assembly drum which will aid in the tire builder in accurately positioning the tire components thereon.

The improved assembly drum's basic structure is disclosed in some detail in the aforementioned United States application Ser. No. 423,442, is described as including an outer surface made up of a plurality of circumferentially spaced, radially movable, rigid segments. The segmented outer surface is further described as covered with an annular elastomeric sleeve. This invention is directed to an improvement of this outer surface. The improvement essentially consists of providing, instead of the annular sleeve, a relatively narrow thin layer or strip of elastomeric material covering each radially movable segment. Each layer includes axially spaced outwardly projecting elastomeric ribs or projections which serve as gripping fingers for the tire components placed thereon. The layers or strips are further characterized in that these ribs are symmetrically disposed on each layer in relation to the circumferential center line of the drum, to thereby serve as guidelines to which the tire builder may refer when assembling various tire components on the drum surface.

Brief description of the drawings

FIG. 1 is a side view of the belt and tread assembly drum partially broken away with parts shown in section.

FIG. 2 is a partial sectional view of the assembly drum with a belt and tread positioned thereon.

FIG. 3 shows a plan view of a single drum surface segment provided with a layer of elastomeric material thereon according to this invention.

FIG. 4 is an elevated view of the segment shown in FIG. 3.

FIG. 5 is an expanded section view along lines 5, 5 of FIG. 3 showing the metal drum segment and its attached layer of elastomeric material.

Preferred embodiments of the invention

Referring to FIG. 1, the assembly drum, according to the present invention, is shown in mounted cantilever fashion in a support housing 2 on a hollow rotatable shaft 4. The shaft 4 is supported in the housing 2 by suitable bearing structure indicated generally as 6. Pulley means 8 are provided which can be driven by a belt (not shown) from a suitable power source (not shown). The drum comprises a cylindrical drum shell 14 supported on an annular sleeve 10 by a web support 12 made integral with both the sleeve 10 and the shell 14. The sleeve 10 is secured to the shaft 4 in any suitable manner to rotate therewith. For example, the sleeve 10 may be keyed or press fitted to the shaft 4.

The cylindrical shell 14 is provided with spaced, outwardly extending annular flanges 16, 18 and 20, which define two annular compartments 21 and 23 on its outer surface. The two annular compartments 21 and 23 serve as seats for two annular inflatable bladders 30 and 31, respectively. The inflatable bladders are preferably constructed of cord reinforced elastomeric material. Each bladder contains an intermediate rib member, such as 37 shown in bladder 31, which divides each bladder into an upper and lower fluid chamber, such as 33 and 35 in bladder 30. The upper chamber is operatively associated with the lower chamber in each bladder through its rib member by a fluid passage, such as passage 36 in bladder 30.

As seen in FIG. 1, the dual chambered bladder 30 is to be associated with a fluid supply means (not shown) through a suitable pressure hose 40 located within the hollow shaft 4. The hose 40 is connected to a T-joint 42 provided with flexible hoses 44 and 46. The flexible hose 44 is shown connected to a valve stem 48 located in an opening 32 in drum shell 14. The hose 44 registers through this valve stem 48 with opening 34 in the bladder 30. Although not particularly shown in FIG. 1, inflatable bladder 31 is associated with flexible hose 46 by similar connections.

At each axial end of the drum shell 14 is one of a pair of identical end rings 50. Each ring is connected through radial support arms 53 to a sleeve, such as 54, secured to rotate with shaft 4 in any suitable manner. Each ring is provided, at its face adjacent the drum shell 14, with an annular groove 52 which serves to limit the radial expansion of the drum surface, as will be more fully explained hereinafter.

The outer surface of the drum, upon which inextensible tire components are to be assembled, is made up of a plurality of circumferentially spaced, axially extending surface members or segments indicated generally as 60. The members or segments 60 are disposed radially outwardly of the drum shell 14 and mounted such that each member 60 spans both annular compartments 21 and 23 on the drum shell surface, the particulars of this mounting arrangement to be more fully described hereinafter.

The structural characteristics of the surface members 60, will be particularly described with reference to FIG. 3 through 5. Each member 60 comprises a thin, relatively narrow, metal segment 62 having a flat outer surface 64. Each segment 62 is integrally provided with two arms 66 extending at approximately right angles to the flat surface 64 of the segment. Each arm 66 terminates in an outwardly extending hook 68. The segments 62 should be constructed of a metal which will withstand the many forces to which the drum will be subject when assembling tire components thereon. It has been found that a high quality spring steel is particularly suited for this purpose.

Affixed to the flat surface 64 of each metal segment 62 is a thin, relatively narrow layer or strip 70 of elastomeric material, to which this invention particularly relates. The layer 70 is preferably made of a relatively tough elastomeric compound of the type sometimes used in the tread stock of a tire. In the preferred form the layer 70 is shaped and cured in a mold and is formed with integral ribs 72 on one surface 74. The ribs are longitudinally spaced along the surface 74 and are preferably symmetrically disposed with respect to the center of that surface. It is also preferred that the layer be designed with an equal number of the ribs on either side of the center of surface 74. The ribs 72 may be of any desired size and spacing. It has been found that ribs which are $\frac{1}{32}''$ high and spaced $\frac{1}{4}''$ apart perform satisfactorily. Further, it may be desirable to allow a large spacing from the center line of the surface 74 to the initial rib on either side. Ribs at, or very near, the center line of the layer lose their effectiveness as guidelines because of the relatively large width of most tire components.

Although the layer 70 is shown to specifically include ribs 72, it is understood that projections of any desired form may be provided without departing from the intended scope of the present invention.

Preferably, the length and width of a layer or strip 70 is approximately equal to the length and width of the flat surface 64 of a metal segment 62. The layer 70 is affixed to the segment 62 so that it covers substantially all of the flat surface 64, and the center of the surface 74 corresponds to the center of the surface 64. The layer 70 is held to the metal segment 62 by any of the known rubber to metal adhesives.

Referring once again to FIGS. 1 and 2, the surface members 60 are placed side by side circumferentially of the drum shell 14, with the arms 66 extending radially inwardly between the end rings 50 and the ends of the shell 14. The adjacent hooks 68 of the respectively adjacent segments 62 provide an annular seat for a garter spring 80 at each end of the drum. This spring 80 biases all the segments radially inwardly to seat upon annular flanges 16, 18 and 20. Inflation of the bladders 30 and 31 forces all the segments, simultaneously, radially outwardly. Hooks 68 will register with the grooves 52 so as to limit this radial expansion. The plurality of segments 62 are positioned with their elastomeric layers 70 to provide a drum surface whose circumferential center line passes through the center or mid-point of each of the ribbed surfaces 74. Thus, the ribs or projections on each surface member are symmetrically disposed with respect to the circumferential center line of the drum.

To begin assembly of the tire components, the drum surface is expanded by inflation of the bladders 30 and 31 to the position shown in FIG. 2. Using the ribs or projections of the drums surface as a guide, a breaker strip, like B shown in FIG. 2, is placed against the drum surface. The drum is rotated and the strip is laid on the surface in the form of an endless belt. The ends of the strip are stitched down. The belt is held to the drum surface due to the tack which exists between the uncured rubber of the belt and the elastomeric layers 70. The belt will not shift axially of the drum since the projections or ribs hold the belt in position. More belts may be applied over the initially assembled belt, or as shown in FIG. 2, the tread may be then placed on the drum. The assembly is further stitched down so that the assembled components mutually adhere as a composite unit. The belt and tread assembly is then ready for transfer to a tire building drum. The belt and tread assembly may be transferred by any suitable means. The assembly need only be held in its assembled position while the bladders 30 and 31 are deflated. The drum surface then contracts allowing unobstructed removal of the assembled unit.

As stated earlier, the assembly drum of this invention, can be used in assembling any or all of the substantially inextensible tire components, which because of their structure, or their position relative to other inextensible components, cannot be built according to the usual flat band process. This normally includes tires which utilize low angle belts in their crown area.

Various modifications are contemplated which can be made by those skilled in the art without departing from the scope of this invention as defined by the appended claims.

What is claimed is:

1. In a cylindrical drum used to assemble substantially inextensible tire components, said drum having a radially expansible outer surface comprising circumferentially spaced, radially movable, metal segments, each segment having a substantially flat outer face extending parallel to the axis of said drum, the improvement wherein each segment is provided with a thin, relatively narrow, axially extending strip of elastomeric material secured to the outer face thereof, each of said strips including a plurality of radially outwardly extending projections.

2. The improvement as defined in claim 1, wherein each of said strips of elastomeric material substantially covers the outer face of each of said segments and said projections are axially spaced thereon.

3. The improvement as defined in claim 2, wherein each of said elastomeric strips contains an equal number of said projections on either side of the circumferential center line of the drum, symmetrically disposed with respect thereto.

4. An improved surface segment adapted to form part of the radially movable outer surface of a radially expansible cylindrical drum used to assemble substantially inextensible tire components comprising
   (A) a thin metal segment having (1) a substantially flat face portion and (2) at least one arm extending at approximately right angles to said face portion for mounting said segment on said drum and
   (B) a thin strip of elastomeric material bonded to said metal segment along said face portion, said strip having (1) an exposed surface with a plurality of raised ribs thereon.

5. The member defined in claim 4 characterized in that said ribs are in spaced parallel relation.

6. The member as defined in claim 5 further characterized in that said ribs are spaced longitudinally along said exposed surface.

References Cited

UNITED STATES PATENTS 2,838,091  6/1958  Kraft.
2,871,912  2/1959  Kraft.
3,171,769  3/1965  Henley et al. _____ 156—416 X BENJAMIN A. BORCHELT, Primary Examiner S. C. BENTLEY, Assistant Examiner